(12) United States Patent
Scholak et al.

(10) Patent No.: US 11,768,831 B2
(45) Date of Patent: Sep. 26, 2023

(54) SYSTEMS AND METHODS FOR TRANSLATING NATURAL LANGUAGE QUERIES INTO A CONSTRAINED DOMAIN-SPECIFIC LANGUAGE

(71) Applicant: ServiceNow, Inc., Santa Clara, CA (US)

(72) Inventors: Torsten Gerald Scholak, Montreal (CA); Dzmitry Bahdanau, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/397,117

(22) Filed: Aug. 9, 2021

(65) Prior Publication Data

US 2022/0358125 A1 Nov. 10, 2022

Related U.S. Application Data

(60) Provisional application No. 63/186,616, filed on May 10, 2021.

(51) Int. Cl.
*G06F 16/2452* (2019.01)
*G06F 16/242* (2019.01)

(52) U.S. Cl.
CPC ...... *G06F 16/24522* (2019.01); *G06F 16/243* (2019.01)

(58) Field of Classification Search
CPC .................. G06F 16/24522; G06F 16/243
See application file for complete search history.

(56) References Cited

U.S. PATENT DOCUMENTS

| 6,609,122 B1 | 8/2003 | Ensor |
| 6,816,898 B1 | 11/2004 | Scarpelli |
| 7,020,706 B2 | 3/2006 | Cates |

(Continued)

OTHER PUBLICATIONS

Scholak, Torsren et al., PICARD: Parsing Incrementally for Constrained Auto-Regressive Decoding from Language Models, EMNLP, Sep. 10, 2021, 7 pages, Cornell University, https://arxiv.org/abs/2109.05093v1.

(Continued)

*Primary Examiner* — Richard L Bowen
*Assistant Examiner* — Aryan D Toughiry
(74) *Attorney, Agent, or Firm* — FLETCHER YODE PC

(57) ABSTRACT

A natural language query to domain-specific language query (NLQ-to-DSLQ) translation system includes a language model and a domain-specific language (DSL) parser that constrains the output of the language model to a DSL, such as structured query language (SQL). At each decoding step, the language model generates a predicted next token for each of a set of potential translations of a NLQ. The DSL parser evaluates each of the potential translations at each decoding step based on a set of stored DSL rules, which define valid terminology, syntax, grammar, and/or other constraints of the DSL. The DSL parser may reject and remove from consideration partial potential translations that are invalid or receive a low parsing score, such that the language model only continues to generate new tokens at the next decoding step for partial potential translations that are determined to be valid and/or sufficiently high scoring.

17 Claims, 7 Drawing Sheets

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,683 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2017/0262501 A1* | 9/2017 | Namboodiri ........ G06F 16/2433 |
| 2020/0301925 A1* | 9/2020 | Zhong .................... G06N 3/006 |
| 2021/0173829 A1* | 6/2021 | Zeng ...................... G06F 40/47 |
| 2022/0229983 A1* | 7/2022 | Zohrevand ............. G06N 20/00 |

OTHER PUBLICATIONS

Scholak, Torsten et al., PICARD—Parsing Incrementally for Constrained Auto-Regressive Decoding from Language Models, Proceedings of the 2021 Conference on Empirical Methods in Natural Language Processing (EMNLP), 7 pages, GitHub, https://github.com/ElementAI/picard.

* cited by examiner

SYSTEMS AND METHODS FOR TRANSLATING NATURAL LANGUAGE QUERIES INTO A CONSTRAINED DOMAIN-SPECIFIC LANGUAGE

CROSS-REFERENCE TO RELATED APPLICATION

This application claims priority to U.S. Provisional Patent Application No. 63/186,616, filed May 10, 2021, and entitled, "SYSTEMS AND METHODS FOR TRANSLATING NATURAL LANGUAGE QUERIES INTO A CONSTRAINED DOMAIN-SPECIFIC LANGUAGE," which is incorporated by reference herein in its entirety for all purposes.

BACKGROUND

The present disclosure relates generally to neural language models, and more specifically to constraining the output of neural language models to produce valid translations of natural language queries in a domain-specific language.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Certain cloud computing platforms may apply one or more language models to enable natural language processing (NLP) for one or more hosted applications. Such models may include pre-trained neural sequence-to-sequence models, such as BART (available from FACEBOOK) and T5 (available from GOOGLE). These models are generally pre-trained based on large corpus and can be applied to enable various NLP operations on the cloud computing platform, such as translation, text summarization, and text correction.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As noted above, certain cloud computing platforms may apply one or more language models to enable NLP operations within hosted applications. For example, it may be desirable for a cloud computing platform to have a system that receives a natural language query (NLQ) from a user, that applies a language model to translate the NLQ into a domain-specific language (DSL), such as structured query language (SQL), and that prompts execution of the translated query to retrieve results that are returned to the user in response to the original NLQ. Additionally, it may be desirable to leverage the encoded knowledge of existing and established language models that have been trained based on large corpuses of text when performing such translations.

However, it is presently recognized that certain language models, such as pre-trained neural sequence-to-sequence models, have an unconstrained output space. This means that, at each auto-regressive decoding step, these language models can produce tens of thousands of (e.g., typically around 40,000 or more) sub-word tokens. While there have been successes in applying these existing pre-trained language models to downstream NLP tasks, controlling and constraining the output of these models remains a challenge. That is, certain NLP applications demand a degree of rigor and exactitude that the language models are presently unable to deliver. For example, when the domain-specific language is a formal language, such as SQL, then it would be ideal for the language model to precisely adhere to all of the lexical, grammatical, logical, and semantical constraints of the SQL specification. Unfortunately, with pre-training alone, these language models may still fail to satisfy these conditions. In other words, even when fine-tuned on training examples in which the output is a constrained domain-specific language (e.g., Python, SQL, a semantic grammar), these models often produce invalid code at inference time, rendering the generated output unusable.

With the foregoing in mind, present embodiments are directed to a natural language query to domain-specific language query (NLQ-to-DSLQ) translation system, which includes a language model and a domain-specific language (DSL) parser that constrains the output of the language model to a domain-specific language (DSL), such as Python, structured query language (SQL), or even a novel programming language. In certain embodiments, the language model may be a pre-trained neural sequence-to-sequence model that is designed to receive a natural language query (NLQ) as input. At each decoding step of the language model, the model generates a predicted next token for each of a set of partial potential translations of the NLQ. The DSL parser evaluates each of the partial potential translations generated by the model at each decoding step based on a set of stored DSL rules, which define valid terminology, syntax, grammar, and/or other constraints of the DSL. In certain embodiments, the DSL parser may reject and remove from consideration partial potential translations that are invalid or receive a low parsing score, such that the language model only continues to generate new tokens at the next decoding step for partial potential translations that are determined to be valid and sufficiently high scoring. In certain embodiments, the DSL parser may, additionally or alternatively, correct an invalid potential translation based on auto-correction and/or fuzzy matching rules of the DSL rules, and allow the language model to continue generating new tokens for the partial translation in subsequent decoding steps. In certain embodiments, the DSL parser may also score and rank the set of partial potential translations at each autoregressive decoding step, at the conclusion of the decoding process, or any combination thereof, based on confidence values generated by the language model for the tokens of the partial potential translation, based on the analysis of the partial potential translation by the DSL parser, or any combination thereof. As such, by incrementally parsing at each decoding step, the DSL parser enables the NLQ-to-DSLQ translation system to "fail early" with respect to invalid and low-scoring translations as they are being generated, which reduces overall computational resource usage and enables the expended computational resources to be focused on generating and validating the most promising potential translations.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
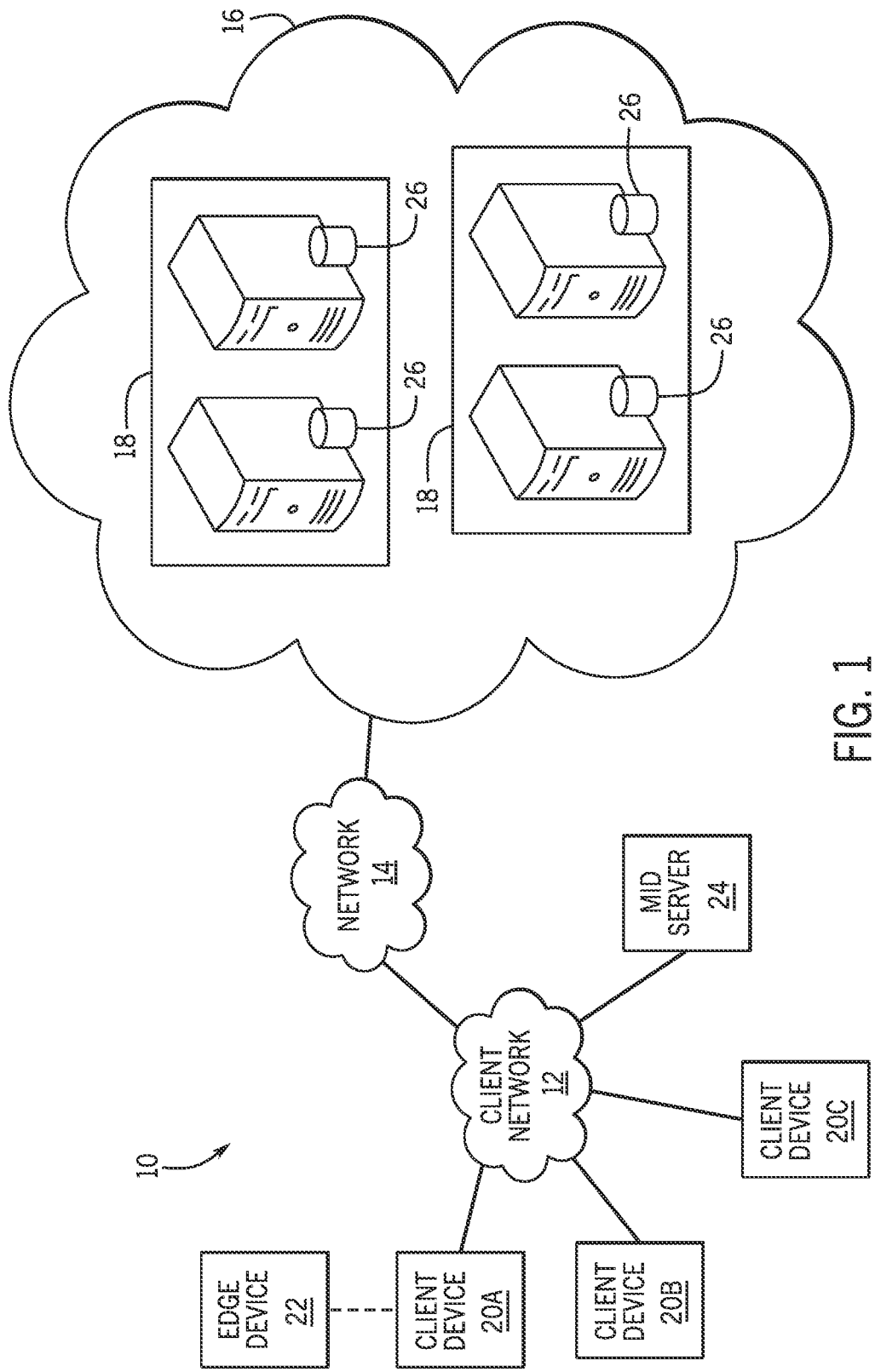
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Present embodiments are directed to a NLQ-to-DSLQ translation system that includes a language model and a DSL parser that constrains the output of the language model to a DSL, such as SQL. In certain embodiments, the language model may be a pre-trained neural sequence-to-sequence model that is designed to receive a NLQ input. At each decoding step of the language model, the model generates a predicted next token for each of a set of partial potential translations of the NLQ. The DSL parser evaluates each of the partial potential translations generated by the model at each decoding step based on a set of stored DSL rules. In certain embodiments, the DSL parser may reject and remove from consideration partial potential translations that are invalid, such that the language model only continues to generate new tokens at the following decoding step for partial potential translations that are determined to be valid. As such, by incrementally parsing at each decoding step, the DSL parser enables the NLQ-to-DSLQ translation system to "fail early" with respect to invalid and/or low-scoring translations as they are being generated, which reduces overall computational resource usage and enables the expended computational resources to be focused on generating and validating the most promising partial translations.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
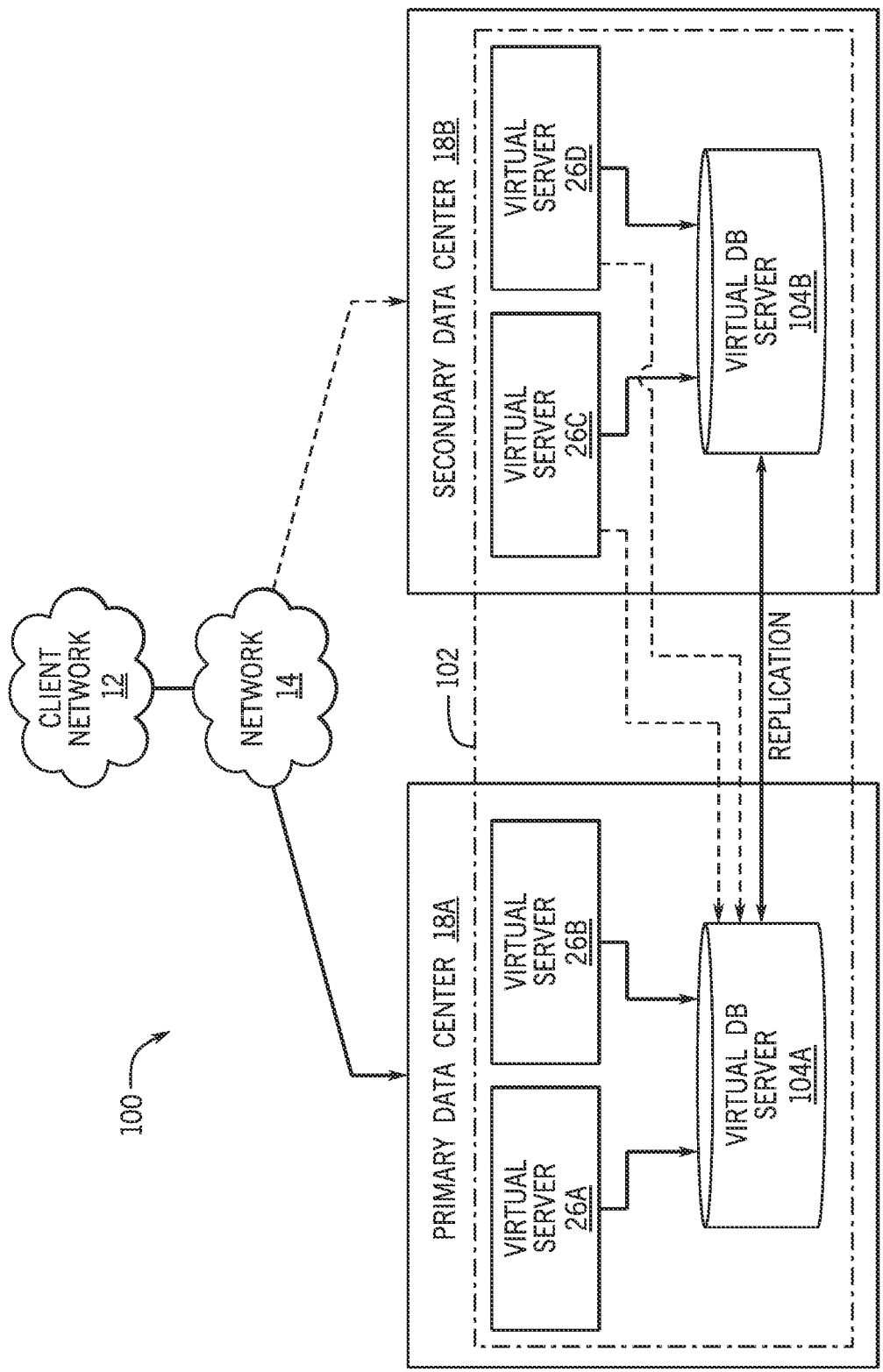
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
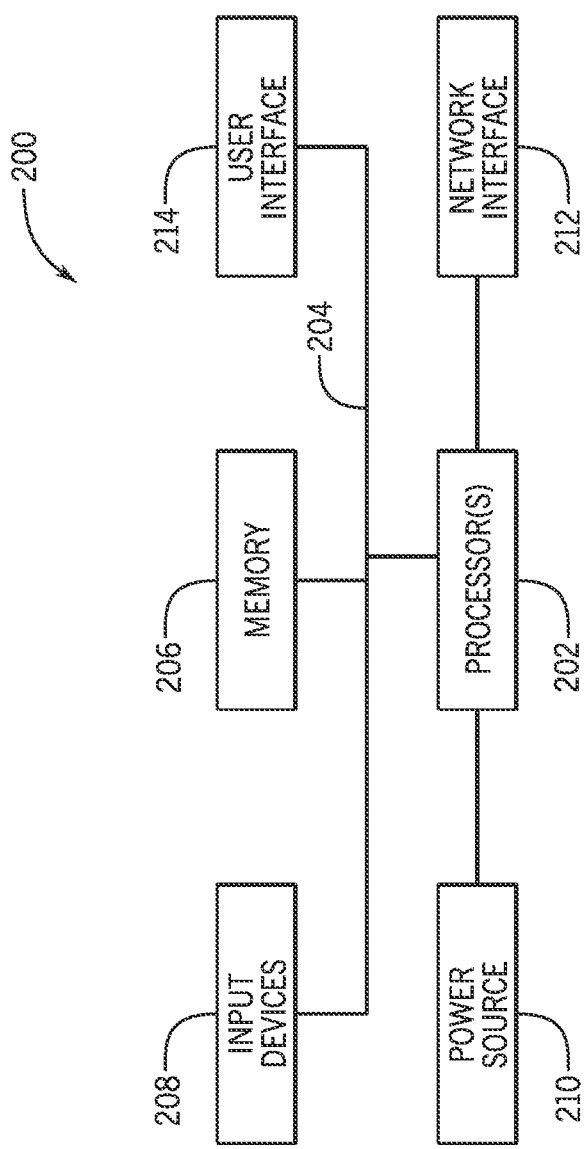
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
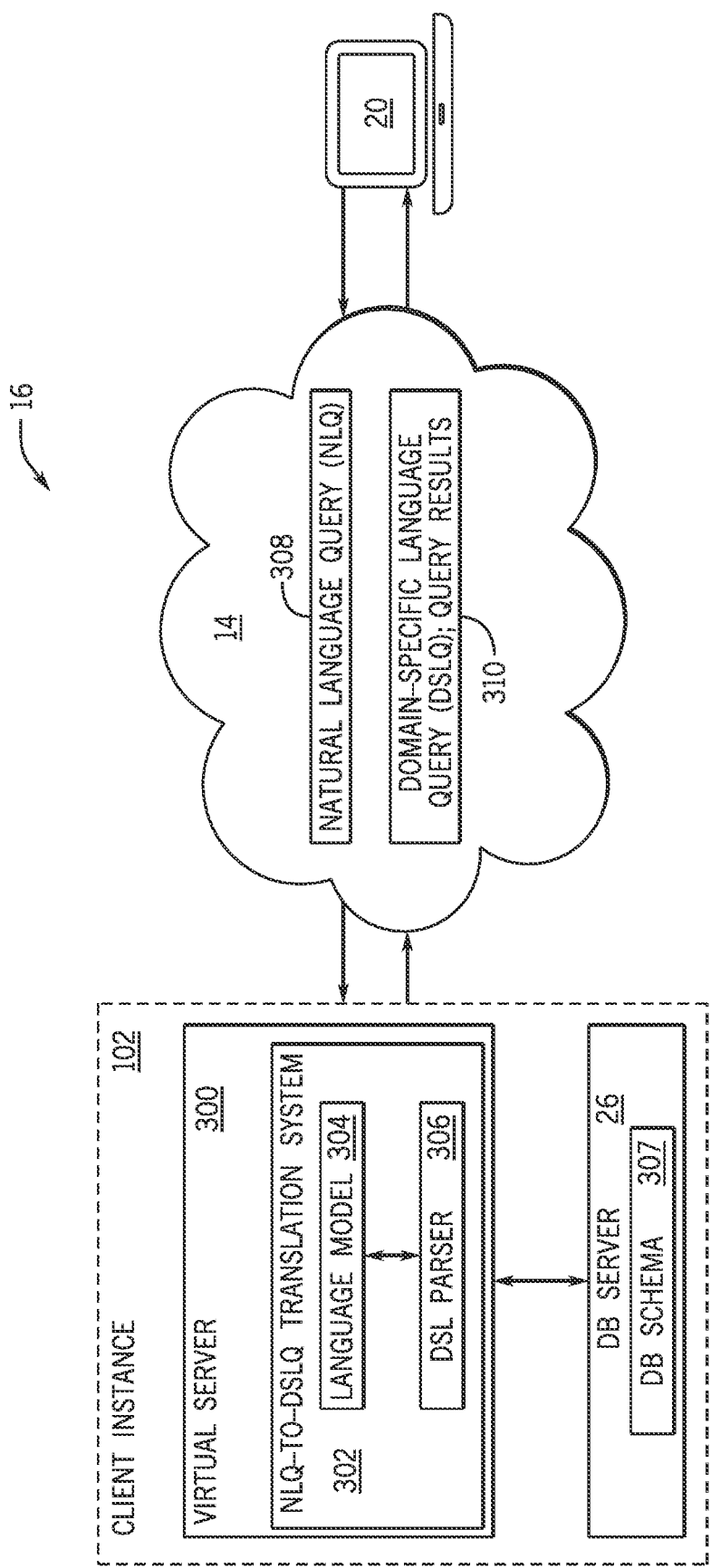
FIG. 4 is a block diagram illustrating an embodiment in which a virtual server of the client instance hosts a natural language query to domain-specific language query (NLQ-to-DSLQ) translation system that includes a language model and a domain-specific language (DSL) parser, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

More specifically, for the client instance 102 of the cloud-based platform 16 illustrated in FIG. 4, the virtual server 300 hosts a NLQ-to-DSLQ translation system 302 that includes a language model 304 and a DSL parser 306. The virtual server 300 is communicatively coupled to the DB server 26, which hosts one or more databases related to the client instance 102. In certain embodiments, the language model 304 may be a pre-trained neural language model. In certain embodiments, the language model 304 may specifically be a pre-trained neural sequence-to-sequence model, such as BART, T5, or another suitable pre-trained neural sequence-to-sequence model. The language model 304 is generally configured to receive a natural language query (NLQ) and to generate a set of potential translations from the NLQ having corresponding confidence scores (e.g., log-softmax continuation scores). For example, in certain embodiments, the language model 304 may receive a NLQ and may generate potential next tokens for each of a set of partial potential translations of the NLQ (also referred to as a set of hypotheses) during a number of auto-regressive decoding steps.

The DSL parser 306 is a rule-based system that is generally configured to receive the set of partial potential translations of the NLQ 308, along with the corresponding confidence scores, as they are generated by the language model 304. For embodiments directed to NLQ-to-SQL translation, the NLQ-to-DSLQ translation system 302 may receive (e.g., retrieve or access) a database schema 307 of DB server 26 that describes aspects of the structure and organization of one or more databases hosted by the DB server 26. As discussed below, the DB schema 307 provides domain-specific knowledge (e.g., database names, table names, column names, alias names, and so forth) that can be leveraged by the DSL parser 306 when evaluating the validity of potential SQL translations of a NLQ 308. For example, in certain embodiments, based on the received schema, the NLQ-to-DSLQ translation system 302 may construct a dictionary (e.g., a key-value map) that stores valid names of tables and columns of a database hosted by the DB server 26 to be used by the DSL parser 306 when evaluating potential translations generated by the language model 304. It may be appreciated that, since different databases have different structures and schemas, the DSL parser 306 may have different constraints and/or different behavior when the NLQ-to-DSLQ translation system 302 is translating NLQs into SQL queries for different databases.

The DSL parser 306 analyzes the output of the language model 304, which, in the case of NLQ-to-SQL translation, is the readable surface form of the SQL code for each of the set of partial potential translations. Based on this analysis, the DSL parser 306 determines which of these translations should be discarded and no longer pursued by the NLQ-to-DSLQ translation system 302 as a potential solution. As discussed below, the DSL parser 306 is able to adequately constrain the output of the language model 304, independently of the beam size. Additionally, while larger beam sizes are generally understood to enable higher quality translations due to the larger number of potential translations generated by the language model 304 at each decoding step, the NLQ-to-DSLQ translation system 302 enables high-quality translations even when smaller beam sizes (e.g., 2, 3, 4, 5, less than 10) are applied. The beam size of the language model defines the maximum number of hypotheses/candidates for which the language model generates n next potential tokens in each decoding step, wherein n is the number of tokens in the vocabulary of the language model 304. It may be appreciated that the operation of the DSL parser 306 is separate and distinct from any pre-training or fine-tuning of the language model 304. In certain embodiments, the DSL parser 306 may be optionally enabled during particular operations of the NLQ-to-DSLQ translation system 302.

During operation, the NLQ-to-DSLQ translation system 302 of the client instance 102 receives a natural language query (NLQ) 308 from a user of the client device 20. For example, the NLQ 308 may be received from a text box of a graphical user interface (GUI) of the client instance 102, such as a search bar of a webpage graphical user interface (GUI) presented on the client device 20. In certain embodiments, the NLQ 308 may be received as a voice recording that is translated to text using a suitable speech-to-text translation plugin. The NLQ 308 may correspond to a request for particular data stored by the DB server 26. The NLQ-to-DSLQ translation system 302 receives and provides the NLQ 308 as input to the language model 304. As discussed in greater detail below, the language model 304 generates one or more potential translations of the NLQ 308, and the partial translations are provided to the DSL parser 306 as they are generated (e.g., at each decoding step). As discussed below, the DSL parser 306 incrementally parses and attempts to validate each of the partial potential translations of the NLQ 308 as they are being generated, rejecting translations that are determined to be invalid and/or low-scoring.

Once the language model 304 has completed processing of the NLQ 308 and the DSL parser 306 identifies one or more valid potential translations of the NLQ 308, NLQ-to-DSLQ translation system 302 selects the highest scoring potential translations as the DSLQ that represents the NLQ 308. When the DSLQ represents a database query (e.g., in SQL), the NLQ-to-DSLQ translation system 302 may provide the DSLQ to the DB server 26 to be executed. In certain embodiments, a response 310 may be provided to the client device 20 that includes the DSLQ and/or the results from the execution of the DSLQ (e.g., a data set having one or more records). In certain embodiments, the client device 20 may present the execution results and/or the DSLQ to the user via a suitable GUI.

In addition to constraining the output of the language model 304 into the DSL, it may be appreciated that the NLQ-to-DSLQ translation system 302 also offers advantages in terms of selection of the language model 304. For example, in one embodiment, a NLQ-to-DSLQ translation system 302 having a smaller language model 304 (e.g., T5-base model) in combination with the DSL parser 306 performed better at NLQ-to-DSL translation than a comparable translation system having a larger language model 304 (e.g., T5-large) without the DSL parser 306. As such, by including and applying the DSL parser 306, the disclosed NLQ-to-DSLQ translation system 302 can enable enhanced translation performance using smaller language models, which consume fewer computing resources during operation.

Figure 5:
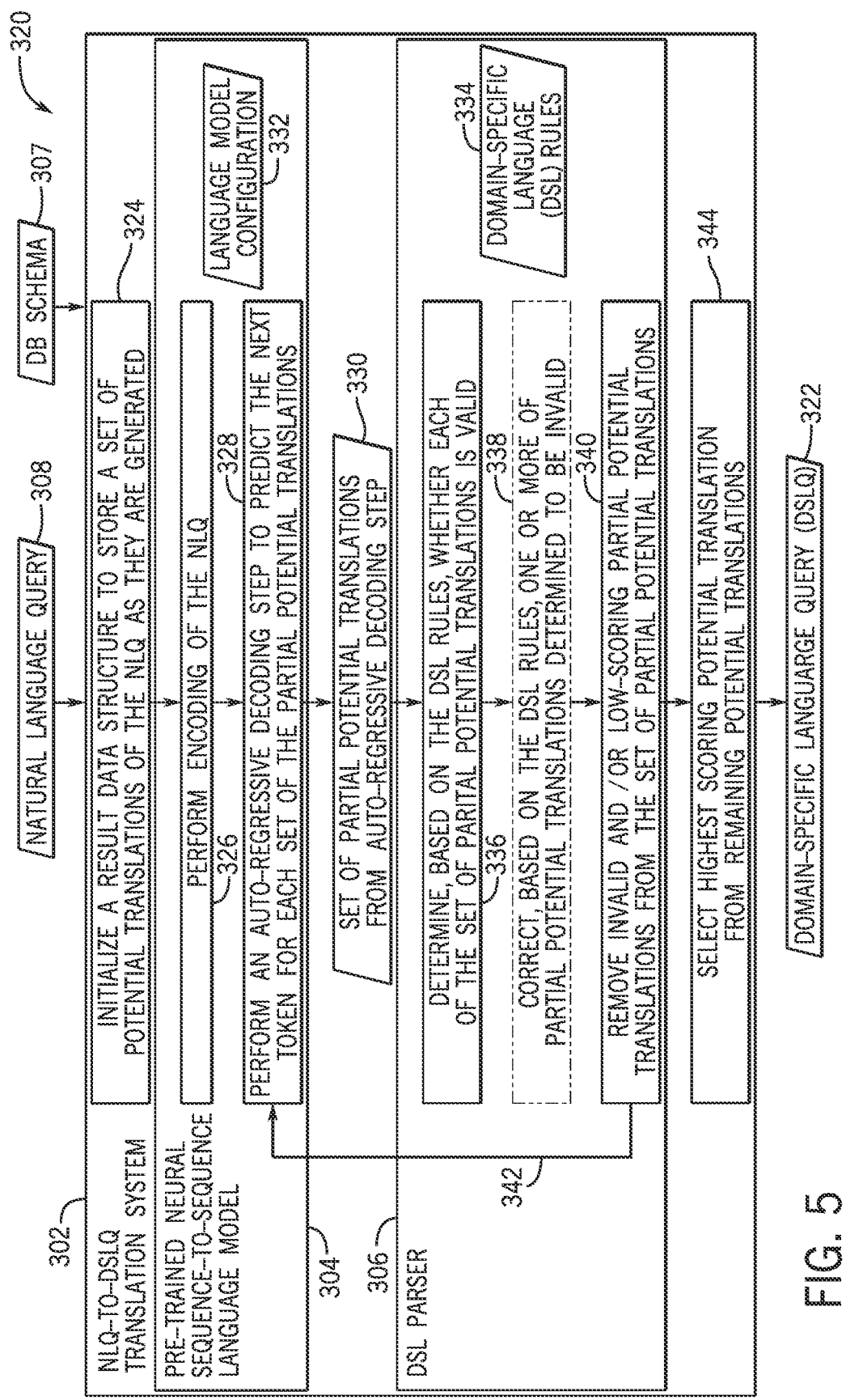
FIG. 5 is a flow diagram of an embodiment of a process whereby an embodiment of the NLQ-to-DSLQ translation system translates a NLQ into a DSLQ using a pre-trained neural sequence-to-sequence language model and the DSL parser, in accordance with aspects of the present disclosure.

FIG. 5 is a flow diagram of an embodiment of a process 320 whereby an embodiment of the NLQ-to-DSLQ translation system 302 translates a received NLQ 308 into a DSLQ 322 using a pre-trained neural sequence-to-sequence language model 304 and an embodiment of the DSL parser 306. For the illustrated embodiment, the process 320 begins with the NLQ-to-DSLQ translation system 302 receiving the NLQ 308 provided by the user, as discussed above. For the illustrated embodiment, the NLQ-to-DSLQ translation system 302 initializes (block 324) a result data structure to store a set of partial potential translations (e.g., a set of hypotheses) produced by the language model 304 over a set of auto-regressive decoding steps. The data structure may be implemented differently in different embodiments. For example, the data structure may be a set of arrays configured to store tokens of potential translations, a set of tree structures having nodes representing tokens of potential translations, other suitable data structures, and/or combinations thereof.

The language model 304 of the NLQ-to-DSLQ translation system 302 receives the initialized result data structure and the NLQ 308, and performs encoding of the NLQ 308 (block 326) using an encoder of the language model 304 to generate a higher order representation of the NLQ 308 (e.g., an internal vector representation of the NLQ 308). The language model 304 then performs (block 328) a first auto-regressive decoding step to predict the first token for a set 330 of potential translations of the NLQ 308, which are stored in the result data structure. In certain embodiments, the language model 304 may operate based on parameter values defined in a stored language model configuration 332. For example, the language model configuration 332 may define a number of tokens, n, in the vocabulary of the language model 304 (e.g., between 10,000 and 100,000 tokens), wherein the language model 304 is configured to output n potential next tokens for each hypothesis at each decoding step (e.g., each time block 328 is performed). The language model configuration 332 may also indicate a beam size that defines the number of potential translation pathways or hypotheses that should be considered or explored at each auto-regressive decoding step (e.g., each time block 328 is performed). By way of specific example, when the language model configuration 332 indicates a beam size of ten, then, the first time the actions of block 328 are performed, the language model 304 may identify n potential first tokens of ten potential translations or hypotheses for the NLQ 308. For this example, the next time the actions of block 328 are performed, the language model 304 may identify n potential next tokens for each of the ten highest scoring hypotheses from the previous auto-regressive decoding step.

For the illustrated embodiment, the set of partial potential translations 330 from the auto-regressive decoding step of block 328 (e.g., the results data structure) is provided to the DSL parser 306 before the language model 304 performs the next decoding step. For the illustrated embodiment, the DSL parser 306 includes a set of DSL rules 334 that define valid terminology, syntax, grammar, and/or other constraints of the DSL. For example, when the NLQ-to-DSLQ translation system 302 is designed to translate NLQs into SQL, the DSL rules 334 may include rules based on information from the DB schema 307, such as DSL rules 344 that evaluate tokens based on a dictionary (e.g., a key-value map) populated with the names and aliases of tables and columns from the DB schema 307. Based on these DSL rules 334, the DSL parser 306 determines (block 336) whether each of the set of partial potential translations is valid, as discussed below with respect to FIG. 6. In certain embodiments, the DSL parser 306 may also score and/or rank the partial translations based on confidence scores provided by the language model for each partial potential translation, based on the validity analysis performed by the DSL parser 306, or a combination thereof. In certain embodiments, the DSL rules 334, or another suitable configuration associated with the DSL parser 306, may store other configuration values that define the operation of the parser, such as a cut-off value, k, that limits the number of hypotheses that are evaluated by the DSL parser 306 in each performance of the actions of block 336. In certain embodiments, the cut-off value, k, of the DSL parser 306 may be less than or equal to the beam size used by the language model 304. For such embodiments, it may be appreciated that this cut-off value limits the branching factor of the search, such that, for each existing hypothesis, there are at most k new hypotheses in each decoding step, and the number of hypotheses being pursued can be maintained at or below the beam size.

In certain embodiments, the DSL rules 334 may include auto-correction rules and/or fuzzy matching rules. For such embodiments, the DSL parser 306 may correct (block 338) one or more invalid partial potential translations based on these DSL rules 334. For example, the DSL rules 334 may include a fuzzy matcher rule that indicates that an unrecognized token of a partial potential translation that is within a threshold edit distance from a recognized token within the vocabulary defined by the DSL rules 334, (e.g., the name of a table, the name of a column, a keyword, a function call, any portion of a SQL database schema) the DSL parser 306 may replace the unrecognized token with the recognized token. In another example, if the DSL parser 306 determines that adding particular punctuation (e.g., a closing parenthesis) to a partial potential translation would render an otherwise invalid translation as valid, then the DSL parser 306 may add the punctuation to the translation. In certain cases, the DSL parser 306 may correct one or more of the partial potential translations within the result data structure in a manner that does not alter the operation of the language model 304 with respect to later auto-regressive decoding steps of the language model 304. In other words, the DSL parser 306 may correct the potential translation in a manner that is obscured to the language model 304, such that the language model 304 continues to operate without being aware of the correction when performing later auto-regressive decoding steps. In certain embodiments, the DSL parser 306 may perform the correction of block 338 as part of the validation of block 336.

For the illustrated embodiment, the DSL parser 306 removes (block 340) invalid and/or low-scoring partial potential translations from the set of partial potential translations 330 (e.g., from the result data structure). By removing invalid and/or low-scoring potential translation pathways from consideration, the DSL parser 306 enables the NLQ-to-DSLQ translation system 302 to desirably "fail early" with respect to these pathways, rejecting them from further consideration. As such, when the language model 304 performs the next auto-regressive decoding step of block 328, as indicated by the arrow 342, the language model 304 only identifies potential next tokens for partial potential translations that were not rejected by the DSL parser 306 in block 340. Therefore, the language model 304 does not consume additional computing resources (e.g., processing time, memory resources) continuing to generate additional tokens for translation pathways that were rejected by the DSL parser 306. Accordingly, the language model 304 can more efficiently use these computing resources to focus on decoding translations that were determined to be valid and/or sufficiently high-scoring during parsing to warrant further exploration. In certain embodiments, when the language model 304 performs the next auto-regressive decoding step of block 328, then the language model 304 may generate n different potential next tokens for each partial potential translation of the set 330 that advanced past the DSL parser 306, up to the beam size of the language model 304. For example, when the language model configuration 332 indicates a beam size of ten, then the language model 304 may generate n different potential next tokens for up to ten partial potential translations that advanced past the DSL parser 306.

For the embodiment illustrated in FIG. 5, the process 320 continues with the language model 304 identifying potential next tokens for each of the partial potential translations that survive the DSL analysis, and the DSL parser 306 incrementally validating and rejecting partial potential translations that are invalid and/or low-scoring. The process 320 concludes when the language model 304 does not generate any additional tokens for the remaining potential translations in the result data structure (e.g., when the language model 304 provides a stop or halt indication). In certain cases, all of the potential translations are rejected by the DSL parser 306, meaning that the DSLQ 322 could not be generated for the NLQ 308. In certain cases, only a single potential translation remains in the result data structure, and the NLQ-to-DSLQ translation system 302 selects this as the DSLQ 322. In certain embodiments, when more than one valid DSLQ 322 is generated for the NLQ 308, the DSL parser 306 may select (block 344) the potential translation with the highest relative score as being the DSLQ 322.

Figure 6:
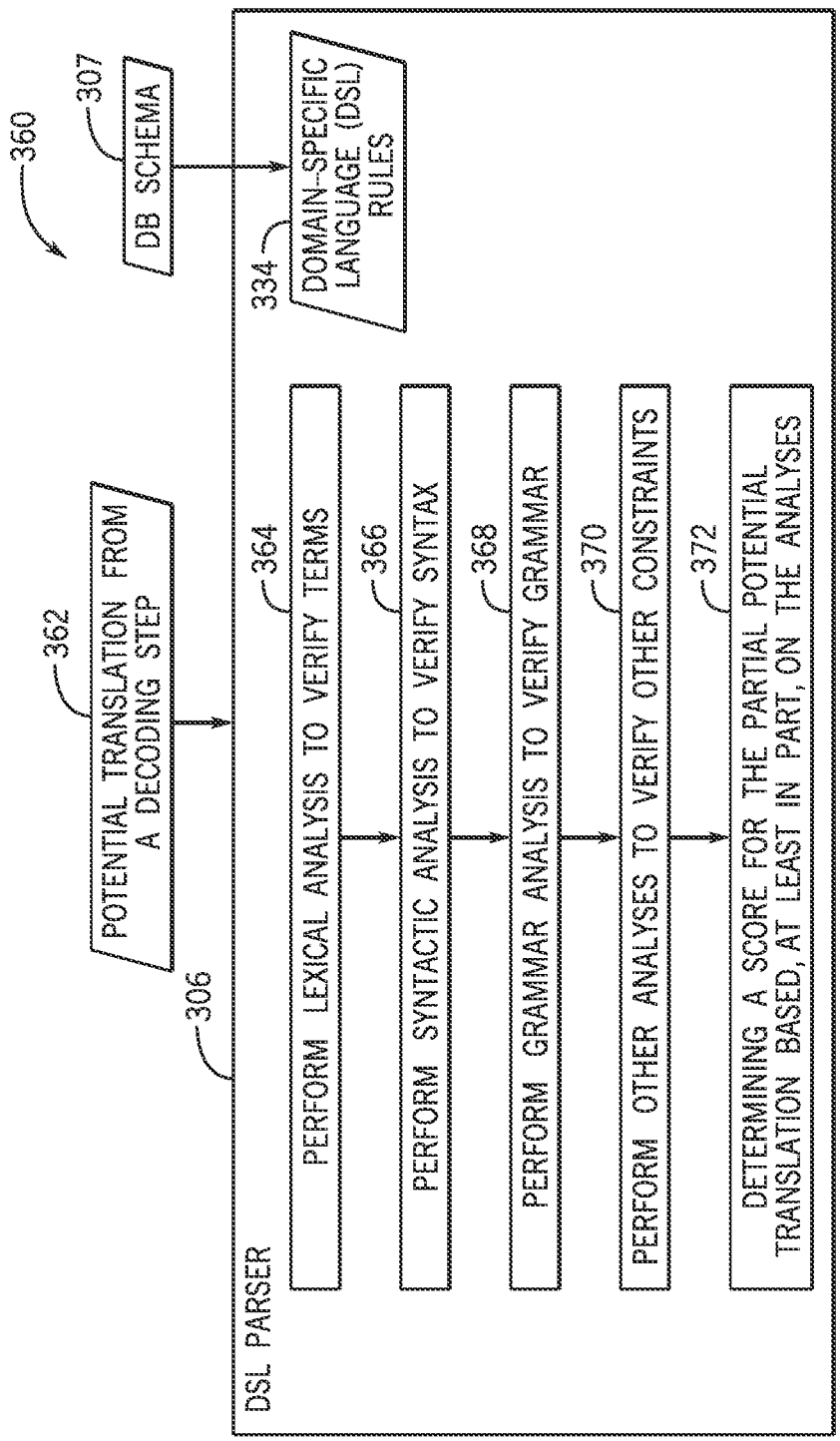
FIG. 6 is a flow diagram of an embodiment of a process whereby the DSL parser validates a potential translation from a decoding step of the language model based on DSL rules, in accordance with aspects of the present disclosure.

FIG. 6 is a flow diagram of an embodiment of a process 360 whereby an embodiment of the DSL parser 306 validates a potential translation 362 (e.g., a partial potential translation of the set of partial potential translations 330) from a decoding step of the language model 304 (e.g., block 328 of FIG. 5). While the process 360 is illustrated as a linear process, it may be appreciated that, in certain embodiments, one or more of the steps of the process 360 may be performed in parallel for enhanced performance. Additionally, it may be appreciated that, in certain embodiments, the DSL parser 306 may be configured to independently evaluate any suitable number of potential translations 362 in parallel for enhanced performance. In certain embodiments, as soon as one analysis determines that the potential translation 362 is invalid, the DSL parser 306 immediately discontinues further analysis of the potential translation 362.

As discussed, the DSL parser 306 may have a set of stored DSL rules 334 that define valid terminology, syntax, grammar, and/or other constraints of the DSL. For the illustrated embodiment, the process 360 begins with the DSL parser 306 performing (block 364) lexical analysis to verify that each token of the potential translation 362 is a valid or recognized term in the DSL. For example, for embodiments in which the DSL is SQL, the DSL rules 334 may include rules defining a dictionary (e.g., generated from the DB schema 307 received from the DB server 26) having the names of each table, column, query, functions, and so forth, hosted by the DB server 26 as valid terms of the DSL. As such, it may be appreciated that the DSL rules 334 can enable the NLQ-to-DSLQ translation system 302 to behave differently based on the domain-specific constraints of each client instance 102 based, at least in part, on the different DB schemas of the databases of different client instances. In certain embodiments, this dictionary may be populated when the NLQ-to-DSLQ translation system 302 is installed and configured on the client instance 102, wherein the NLQ-to-DSLQ translation system 302 may process the DB schema 307 received from the DB server 26, as illustrated in FIG. 4, and the dictionary may be updated in response to changes in the DB schema 307. The DSL rules 334 may include rules that define keywords, reserved words, or built-in functions of the DSL, such as "SELECT", "DROP", "FROM", "COUNT" when the DSL is SQL. In certain embodiments, the DSL rules 334 may define fuzzy matching and/or auto-correction rules that enable an unrecognized token from the potential translation 362 to be matched with, and replaced with, a sufficiently similar recognized token from the dictionary.

For the embodiment illustrated in FIG. 6, the process 360 continues with the DSL parser 306 performing syntactic analysis to verify the syntax of the potential translation 362 (block 366) and performing grammar analysis to verify the grammar of the potential translation 362 (block 368). For example, the DSL rules 334 may include rules dictating that certain tokens (e.g., an open parenthesis, an open quotation mark, an open bracket) are eventually followed by other tokens (e.g., a close parenthesis, a close quotation mark, a close bracket). Other syntax and/or grammar related rules of the DSL rules 334 may include rules dictating that certain tokens should appear in a particular order (e.g., "SELECT" should come before "FROM" in a SQL query). The DSL parser 306 may also perform other analysis to verify other constraints of the DSL defined by the DSL rules 334 (block 370). For example, the DSL parser 306 may perform type checking to ensure that proper data types are used within the potential translation 362. In certain embodiments, the DSL parser 306 may determine whether or not the potential translation 362 is internally consistent and has sufficient structural integrity. For example, the DSL parser 306 may determine that the potential translation 362 is invalid when a portion of the translation (e.g., a "FROM" clause) is incoherent with other clauses of the potential translation.

In certain embodiments, when the DSL parser 306 determines that the potential translation 362 is valid based on the results of blocks 364, 366, 368, and 370, the DSL parser 306 may determine (block 372) a parsing score for the potential translation. For example, in certain embodiments, the potential translation 362 may be received from the language model 304 along with a confidence score generated by the language model 304 for the potential translation. In certain embodiments, the DSL parser 306 may, additionally or alternatively, generate parsing scores for the potential translation 362 from the analyses of blocks 364, 366, 368, and 370. For example, when the potential translation 362 has one or more terms that were corrected based on fuzzy matching rules, the potential translation 362 may receive a penalized lexical analysis score relative to a potential translation having all terms exactly match to the dictionary of terms in the DSL rules 334. The DSL parser 306 may award a higher syntax analysis and/or grammar analysis score to the potential translation 362 when it has less than a threshold level of complexity. Additionally, in certain embodiments, the DSL parser 306 may penalize the syntax analysis and/or grammar analysis score of the potential translation 362, rather than rejecting the potential translation as completely invalid, when the potential translation lacks a particular feature (e.g., a closing parenthesis) that may be identified during a later decoding step of the language model 304. In certain embodiments, the DSL parser 306 may use the parse score of a potential translation 362 to modify the corresponding confidence score of the potential translation, and this change in the confidence score may be used by the language model 304 in the subsequent decoding step. As such, a potential translation 362 may be reduced in rank or entirely ejected from the beam in a subsequent decoding step of the language model 304 as a result of this modified confidence score.

Figure 7:
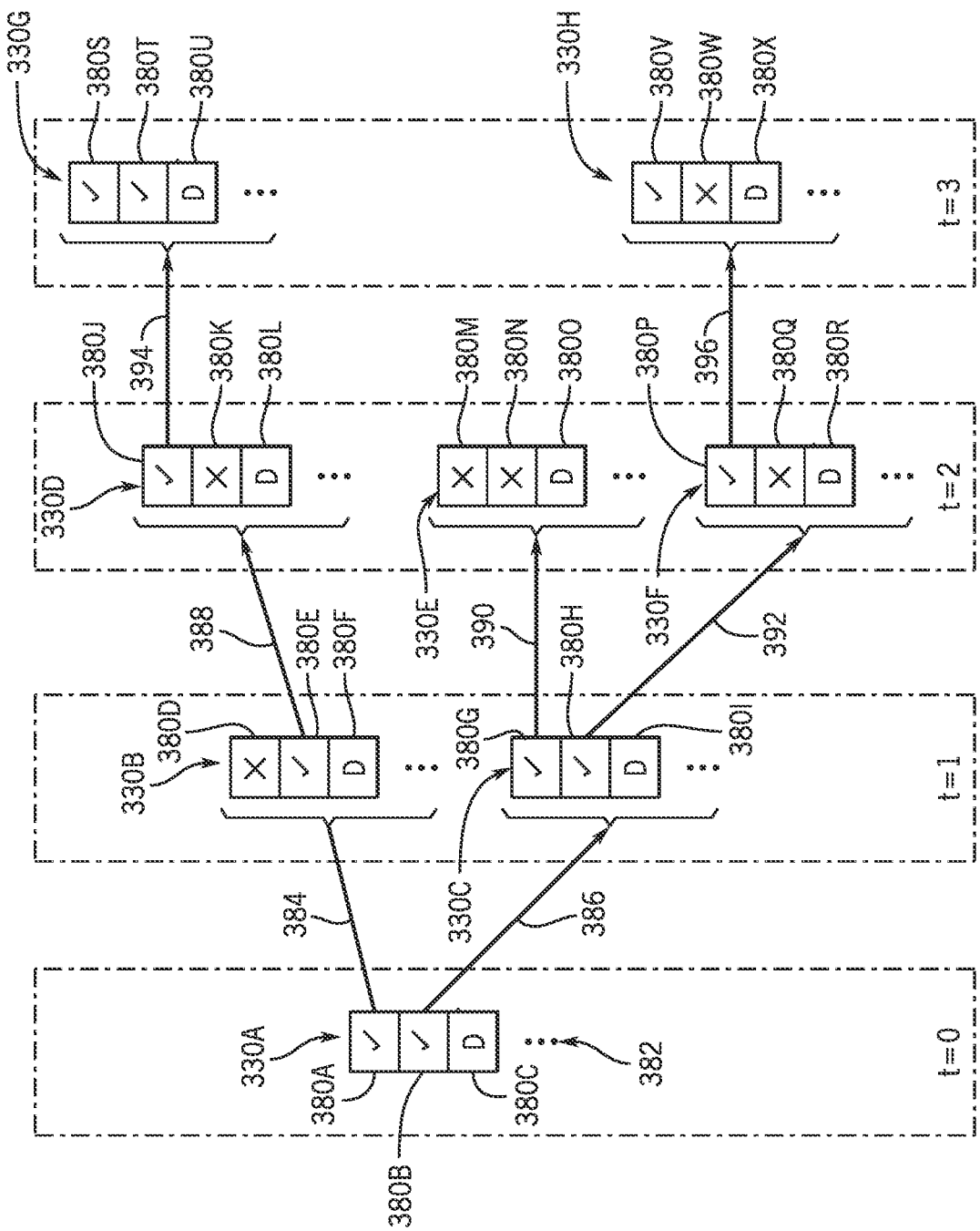
FIG. 7 is a diagram illustrating an embodiment in which the NLQ-to-DSLQ translation system performs a constrained beam search during an example translation operation.

FIG. 7 is a diagram illustrating an embodiment in which the NLQ-to-DSLQ translation system 302 is used to perform a constrained beam search during an example translation operation. For the illustrated embodiment, the language model 304 is configured to have a beam size of three, for example, based on a beam size defined in the language model configuration 332. Additionally, the DSL parser 306 is configured to enforce a cut-off value, k, of two, for example, based on a cut-off value defined in the DSL rules 334. In other embodiments, the beam size and/or the cut-off value may be any suitable value (e.g., 3, 4, 5, 6, and so forth). For the illustrated embodiment, the first four decoding steps are performed by the language model 304 during an example translation operation, wherein each decoding step is represented by increasing values of t (e.g., from 0 to 3).

For the embodiment illustrated in FIG. 7, after the first decoding step of the language model 304 (i.e., at t=0), the DSL parser 306 receives the set 330A of partial potential translations. Each partial potential translation 380 of the set 330A is a potential first token for different potential translation of the NLQ, and may be received (e.g., in the result data structure) with a corresponding confidence score determined by the language model 304 for each partial potential translation 380. It may be appreciated that the set 330A of partial potential translations may be sorted by descending confidence scores. For the illustrated example, the language model 304 produces n partial potential translations 380 at the first decoding step. As such, prior to evaluating the set 330A of partial potential translations based on the DSL rules 334 as discussed with respect to FIG. 6, the DSL parser 306 enforces a cut-off value (k) of two, selecting only the top two partial potential translations (e.g., partial potential translations 380A and 380B) for evaluation and discarding any remaining partial potential translations (e.g., partial potential translation 380C) generated by the language model 304 during the first decoding step. In FIG. 7, the partial potential translations 380 that are discarded are denoted with a D, and any number of partial potential translations 380 may be discarded, as denoted by the corresponding ellipse 382. In certain embodiments, to discard and remove these partial potential translations 380 of the set 330A from further decoding by the language model 304, the DSL parser 306 may override or modify the confidence scores determined and used by the language model 304 for these translations (e.g., setting these confidence scores to negative infinity) to signal to the language model 304 that these translations should no longer be pursued in subsequent decoding steps.

For the example illustrated in FIG. 7, after enforcing the cut-off value, k, the DSL parser 306 evaluates the top partial potential translations 380 of the set 330A (e.g., partial potential translations 380A and 380B) based on the DSL rules 334, as discussed above with respect to FIG. 6. It may be appreciated that, since each of the partial potential translations 380 are evaluated independently, in certain embodiments, the DSL parser 306 may evaluate these translations in parallel for enhanced performance (e.g., reduced runtime). For the illustrated example, both partial potential translations 380A and 380B are determined to be valid and/or determined to having parsing scores above a predetermined threshold values to advance, which is denoted by check mark notation in FIG. 7. As such, in the second decoding step, the language model 304 determines n next tokens only for each of the partial potential translations 380A and 380B of the set 330A. After a second decoding step (i.e., at t=1), the DSL parser 306 receives, from the language model 304, two sets 330 of partial potential translations: a set 330B representing n next token continuations of the partial potential translation 380A (as indicated by the arrow 384), and a set 330C representing n next token continuations of the partial potential translation 380B (as indicated by the arrow 386).

Prior to evaluating the sets 330B and 330C of partial potential translations based on the DSL rules 334, for the illustrated embodiment, the DSL parser 306 again enforces the cut-off value (k), selecting only the top two partial potential translations from each of the sets 330B and 330C (e.g., partial potential translations 380D and 380E from set 330B and partial potential translations 380G and 380H from set 330C) for evaluation and discarding any remaining partial potential translations (e.g., partial potential translations 380F and 380I) generated by the language model 304 during the second decoding step. The DSL parser 306 evaluates the top partial potential translations 380 of the sets 330B and 330C (e.g., partial potential translations 380D, 380E, 380G, 380H) based on the DSL rules 334, as discussed above with respect to FIG. 6. For the illustrated example, only partial potential translations 380E of the set 330B is determined to be valid and/or determined to have a parsing score above a predetermined threshold value, while the partial potential translations 380D is determined to be invalid and/or determined to have a parsing score below the predetermined threshold value. Additionally, both partial potential translations 380G and 380H of the set 330C are determined to be valid and/or determined to have parsing scores above a predetermined threshold value to advance to the next decoding step.

In the third decoding step, the language model 304 determines n next potential tokens for each of the partial potential translation 380E of the set 330B and partial potential translations 380G and 380H of the set 330C. After the third decoding step (i.e., at t=2), the DSL parser 306 receives, from the language model 304, three sets 330 of partial potential translations: a set 330D representing continuations of the partial potential translation 380E from set 330B (as indicated by the arrow 388), a set 330E representing continuations of the partial potential translation 380G from set 330C (as indicated by the arrow 390), and a set 330F representing continuations of the partial potential translation 380H (as indicated by the arrow 392).

Prior to evaluating the sets 330D, 330E, and 330F based on the DSL rules 334, the DSL parser 306 again enforces the cut-off value (k), selecting only the top two partial potential translations from each of the sets 330D, 330E, and 330F (e.g., partial potential translations 380J and 380K from set 330D; partial potential translations 380M and 380N from set 330E; and partial potential translations 380P and 380Q from set 330F) for evaluation and discarding any remaining partial potential translations (e.g., partial potential translations 380L, 380O, and 380R) generated by the language model 304 during the third decoding step. The DSL parser 306 evaluates the top partial potential translations 380 of the sets 330D, 330E, and 330F (e.g., partial potential translations 380J, 380K, 380M, 380N, 380P, and 380Q) based on the DSL rules 334, as discussed above with respect to FIG. 6. For the illustrated example, only partial potential translations 380J of the set 330D is determined to be valid and/or determined to have a parsing score above a predetermined threshold value, while the partial potential translations 380K is determined to be invalid and/or determined to have a parsing score below the predetermined threshold value. Both of the partial potential translations 380M and 380N of the set 330E are determined to be invalid and/or determined to have a parsing scores below the predetermined threshold value, meaning that no further potential translations will be pursued down this pathway. Additionally, only partial potential translations 380P of the set 330F is determined to be valid and/or determined to have a parsing score above a predetermined threshold value, while the partial potential translations 380Q is determined to be invalid and/or determined to have a parsing score below the predetermined threshold value.

In the fourth decoding step, the language model 304 determines n next potential tokens for the partial potential translation 380J of the set 330D and for partial potential translation 380P of the set 330F. After the fourth decoding step (i.e., at t=3), the DSL parser 306 receives, from the language model 304, two sets 330 of partial potential translations: a set 330G representing continuations of the partial potential translation 380J from set 330D (as indicated by the arrow 394), and a set 330H representing continuations of the partial potential translation 380P from set 330F (as indicated by the arrow 396). Prior to evaluating the sets 330G and 330H based on the DSL rules 334, the DSL parser 306 again enforces the cut-off value (k), selecting only the top two partial potential translations from each of the sets 330G and 330H (e.g., partial potential translations 380S and 380T from set 330G, partial potential translations 380V and 380W from set 330H) for evaluation and discarding any remaining partial potential translations (e.g., partial potential translations 380U and 380X) generated by the language model 304 during the fourth decoding step. The DSL parser 306 evaluates the top partial potential translations 380 of the sets 330G and 330H (e.g., partial potential translations 380S, 380T, 380V, and 380W) based on the DSL rules 334, as discussed above with respect to FIG. 6. For the illustrated example, partial potential translations 380S and 380T of the set 330D are determined to be valid and/or determined to have parsing scores above a predetermined threshold value. Additionally, only partial potential translations 380V of the set 330H is determined to be valid and/or determined to have a parsing score above a predetermined threshold value, while the partial potential translations 380W is determined to be invalid and/or determined to have a parsing score below the predetermined threshold value. In certain embodiments, the process represented in FIG. 7 continues until the language model 304 provides a stop indication or until no viable pathways remain viable for the language model 304 to pursue.

Example: NLQ-to-SQL Translation System

As a specific example of the NLQ-to-DSLQ translation system 302 generally described above, this section discusses an embodiment of a NQL-to-SQL translation system. The example NQL-to-SQL translation system includes a SQL parser as an embodiment of the DSL parser 306 discussed above, which specifically designed to constrain the output of a pre-trained language model 304 of the system to valid and executable SQL. The SQL parser is compatible with existing auto-regressive language model decoders and vocabulary, including but not limited to those of large pre-trained transformers. The SQL parser is capable of functioning with relatively narrow beam sizes (e.g., 2, 3, 4, 5, less than 10), which reduces the computing resources consumed by the NLQ-to-DSLQ translation system 302 during a translation operation. The SQL parser may be entirely absent from pre-training or fine-tuning of the language model, and can be easily and optionally enabled at inference time. As for the embodiments discussed above, the SQL parser operates directly on the output of the language model which, in the case of text-to-SQL translation, is the readable surface form of the SQL code.

During NQL-to-SQL translation, the SQL parser warps model prediction scores (e.g., log-softmax continuation scores determined by the language model 304) and integrates with existing algorithms for greedy and beam search used in auto-regressive decoding from language models. For the example system, the SQL parser receives, as inputs or arguments, the token identifiers (IDs) of the current hypothesis and, for each vocabulary token, the log-softmax continuation scores predicted by the language model 304. The SQL parser has, as part of the DSL rules 334 discussed above, SQL schema information, including information regarding the names of tables and columns and regarding which column resides in which table.

At each decoding step of the language model, in certain embodiments, the SQL parser first enforces a cut-off value, k, that restricts prediction to the top-k highest probability tokens of each hypothesis, based on the log-softmax continuation scores determined by the language model. The SQL parser then evaluates the hypotheses associated with top-k highest probability tokens based on the DSL rules 334. In certain embodiments, the SQL parser assigns a confidence score of negative infinity (e.g., a lowest possible score) to hypotheses in the result data structure determined to be invalid or determined to have a parsing score below a predetermined threshold value based on the DSL rules 334. In certain embodiments, the DSL rules 334 may be implemented and performed by the SQL parser using fast incremental parsing based on monadic combinators. In certain embodiments, the SQL parser may be configured for three escalating modes of evaluation: lexing mode, parsing-without-guards mode, and parsing-with-guards mode. For such embodiments, a hypothesis that passes a higher evaluation mode will pass a lower evaluation mode, but not necessarily vice versa.

For the example embodiment, when operating in lexing mode, the SQL parser evaluates the hypotheses generated by the language model 304 only on a lexical level based on the DSL rules 334. That is, the SQL parser attempts to convert the partial, detokenized language model output to a whitespace delimited sequence of individual SQL keywords (e.g., SELECT, FROM), punctuation (e.g., parentheses, commas), operators (e.g., plus symbols, minus symbols), literals (e.g., strings and numbers), and identifiers (e.g., aliases, tables, and columns) without being sensitive to the order in which these lexical items appear. As such, the SQL parser can detect spelling errors in keywords or reject table and column names that are invalid for the given SQL schema.

For the example embodiment, when operating in parsing-without-guards mode, in addition performing lexical analysis, the SQL parser also evaluates the hypotheses generated by the language model 304 on a grammatical level based on the DSL rules 334. In certain embodiments, the SQL parser attempts to parse the detokenized model output to a data structure that represents the abstract syntax tree (AST) for each hypothesis (e.g., each predicted SQL query). Unlike lexing mode, in parsing-without-guards mode, the order in which keywords and clauses appear is considered and evaluated by the SQL parser. The SQL parser can reject invalid query structures based on the DSL rules 334 (e.g., find missing FROM clauses or incorrect orders of clauses and keywords). When operating in parsing-without-guards mode, the SQL parser can also detect a range of issues with the compositions of SQL expressions. For example, when the SQL parser matches on a table identifier (TID) and column identifier (CID) pattern (e.g., TID.CID), and the SQL parser determines that the indicated table lacks the indicated column, then the parser may reject the hypothesis as invalid. In another example, when the SQL parser first matches on an alias and CID pattern (e.g., alias.CID), then later matches the table as an alias pattern, and the matched table does not include the indicate column, then the hypothesis may be rejected as invalid. The SQL parser may include one or more similar DSL rules for sub-queries bound to table aliases. When operating in parsing-without-guards mode, the SQL parser can also prohibit duplicate binding of a table alias in the same select scope, while still permitting shadowing of aliases defined in a surrounding scope, which can be a feature in nested SQL queries.

For the example embodiment, when operating in parsing-with-guards mode, in addition performing lexical analysis and the parsing-without-guards analysis discussed above, the SQL parser performs in additional analyses, referred to herein as guards, while assembling the SQL query. These guards may be stored as part of the DSL rules 334. When the SQL parser matches on certain patterns, such as TID.CID or alias.CID, then guards determine whether the indicated table or alias is eventually brought into scope within a FROM clause to determine validity. Additionally, the guards may also evaluate whether an indicated alias is can be resolved to a table or a sub-query having the indicated column to determine validity. If the SQL parser matches on the pattern CID, then another guard evaluates whether exactly one table is eventually brought into scope that contains the indicated column to further verify validity. It may be appreciated that these guards are generally enforced eagerly in order to fail fast and eject invalid hypotheses from the beam at the earliest possible time. In certain embodiments, other guards may be applied by the SQL parser during parsing-with-guards mode operation, such as evaluating whether expressions that are compared are of the same or comparable data types, or evaluating whether column types selected by UNION, EXCEPT, or INTERSECT queries suitably match.

The technical effects of the present disclosure include a NLQ-to-DSLQ translation system that translates NLQs into valid DLSQs. During operation, a language model of the NLQ-to-DSLQ translation system generates a predicted next token for each of a set of partial potential translations of the NLQ. A DSL parser of the NLQ-to-DSLQ translation system evaluates each of the partial potential translations generated by the model at each decoding step based on a set of stored DSL rules. In certain embodiments, the DSL parser may reject and remove from consideration partial potential translations that are invalid, such that the language model only continues to generate new tokens at the following decoding step for partial potential translations that are determined to be valid. As such, by incrementally parsing at each decoding step, the DSL parser enables the NLQ-to-DSLQ translation system to "fail early" with respect to invalid and/or low-scoring translations as they are being generated, which reduces overall computational resource usage and enables the expended computational resources to be focused on generating and validating the most promising partial translations. As such, the disclosed NLQ-to-DSLQ translation system enables simple and effective constrained decoding with large pre-trained language models.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A natural language query (NLQ) to domain-specific language query (DSLQ) translation system, comprising:
   at least one memory configured to store a language model and a domain-specific language (DSL) parser having a set of DSL rules, wherein the language model comprises a pre-trained neural sequence-to-sequence model; and
   at least one processor configured to execute stored instructions to cause the NLQ-to-DSLQ translation system to perform actions comprising:
      receiving a natural language query (NLQ) from a user;
      initializing a result data structure to store potential translations of the NLQ in a domain-specific language (DSL); and
      providing the NLQ and the result data structure as inputs to the language model, wherein the language model is configured to perform encoding of the NLQ and then sequentially determine a next potential token for each of the potential translations of the result data structure over a plurality of auto-regressive decoding steps, wherein, after each auto-regressive decoding step of the plurality of auto-regressive decoding steps of the language model, the actions further comprise:
         providing the result data structure as input to the DSL parser, wherein the result data structure includes a respective confidence score determined by the language model for each of the potential translations during each auto-regressive decoding step, discarding, via the DSL parser, a first one or more potential translations of the result data structure based on the respective confidence score of each of the first one or more potential translations, performing, via the DSL parser, an evaluation of the potential translations of the result data structure based on the set of DSL rules, and discarding, via the DSL parser, a second one or more of the potential translations of the result data structure based on the evaluation.

2. The NLQ-to-DSLQ translation system of claim 1, wherein the DSL is structured query language (SQL).

3. The NLQ-to-DSLQ translation system of claim 1, wherein the language model is configured to determine the respective confidence score for each of the potential translations of the result data structure at each of the plurality of auto-regressive decoding steps.

4. The NLQ-to-DSLQ translation system of claim 3, wherein, after each auto-regressive decoding step of the plurality of auto-regressive decoding steps of the language model, the actions further comprise:

prior to performing the evaluation, retaining, via the DSL parser, a number of highest confidence scoring potential translations of the result data structure, wherein the number is determined based on a cut-off value defined in the set of DSL rules, and wherein a remainder of the potential translations is discarded from the result data structure prior to the evaluation.

5. The NLQ-to-DSLQ translation system of claim 1, wherein, to discard the second one or more of the potential translations, the at least one processor is configured to execute the stored instructions to cause the NLQ-to-DSLQ translation system to perform actions comprising:

setting, via the DSL parser, the respective confidence score within the result data structure respectively associated with each of the second one or more of the potential translations to a lowest possible value, wherein the language model is configured to discontinue determining the next potential token for the potential translations of the result data structure having respective confidence scores with the lowest possible value.

6. The NLQ-to-DSLQ translation system of claim 1, wherein, to perform the evaluation, the at least one processor is configured to execute the stored instructions to cause the NLQ-to-DSLQ translation system to perform actions comprising:

performing lexical analysis of the potential translations of the result data structure based on one or more lexical rules of the set of DSL rules;

performing syntactic analysis of the potential translations of the result data structure based on one or more syntactic rules of the set of DSL rules; and performing grammar analysis of the potential translations of the result data structure based on one or more grammar rules of the set of DSL rules.

7. The NLQ-to-DSLQ translation system of claim 6, wherein, to perform the evaluation, the at least one processor is configured to execute the stored instructions to cause the NLQ-to-DSLQ translation system to perform actions comprising:

determining a respective parsing score for each of the potential translations of the result data structure based, at least in part, on the lexical analysis, the syntactic analysis, and the grammar analysis.

8. The NLQ-to-DSLQ translation system of claim 7, wherein the second one or more of the potential translations are discarded based on having a respective parsing score that is below a predefined threshold value.

9. The NLQ-to-DSLQ translation system of claim 1, wherein, after each auto-regressive decoding step of the plurality of auto-regressive decoding steps of the language model, the actions further comprise:

after performing the evaluation, applying a correction to at least one of the potential translations of the result data structure based on the set of DSL rules.

10. The NLQ-to-DSLQ translation system of claim 9, wherein the result data structure is configured to obscure the correction from the language model during a subsequent auto-regressive decoding step.

11. A method of operating performing a natural language query (NLQ) to domain-specific language (DSL) translation, comprising:

receiving a natural language query (NLQ) from a user;

initializing a result data structure to store potential translations of the NLQ in a domain-specific language (DSL); and providing the NLQ and the result data structure as inputs to a language model, wherein the language model comprises a pre-trained neural sequence-to-sequence model, wherein the language model performs encoding of the NLQ and then sequentially determines a next potential token for each of the potential translations of the result data structure over a plurality of auto-regressive decoding steps, and wherein, after each auto-regressive decoding step of the plurality of auto-regressive decoding steps of the language model, the method further comprises:

providing the result data structure as input to a DSL parser, wherein the result data structure includes a respective confidence score determined by the language model for each of the potential translations during each auto-regressive decoding step, discarding, via the DSL parser, a first one or more potential translations of the result data structure based on the respective confidence score of each of the first one or more potential translations, performing, via the DSL parser, an evaluation of the potential translations of the result data structure based on DSL rules of the DSL parser, and discarding, via the DSL parser, a second one or more of the potential translations of the result data structure based on the evaluation.

12. The method of claim 11, wherein the language model determines the respective confidence score for each of the potential translations of the result data structure at each of the plurality of auto-regressive decoding steps.

13. The method of claim 12, wherein, after each auto-regressive decoding step of the plurality of auto-regressive decoding steps of the language model, the method further comprises:

prior to performing the evaluation, retaining, via the DSL parser, a number of highest confidence scoring potential translations of the result data structure, wherein the number is determined based on a cut-off value defined in the DSL rules, and wherein a remainder of the potential translations is discarded from the result data structure prior to performing the evaluation.

14. The method of claim 11, wherein performing the evaluation comprises:

performing lexical analysis of the potential translations of the result data structure based on one or more lexical rules of the DSL rules;

performing syntactic analysis of the potential translations of the result data structure based on one or more syntactic rules of the DSL rules;

performing grammar analysis of the potential translations of the result data structure based on one or more grammar rules of the DSL rules; and determining a respective parsing score for each of the potential translations of the result data structure based, at least in part, on the lexical analysis, the syntactic analysis, and the grammar analysis.

15. The method of claim 14, wherein the one or more of the potential translations are discarded in response to being determined to be invalid when performing the evaluation or in response to having a respective parsing score that is below a predefined threshold value.

16. A non-transitory, computer-readable medium storing instructions of a natural language query (NLQ) to domain-specific language (DSL) translation system, the instructions executable by a processor of a computing system, and the instructions comprising instructions to:

receive a natural language query (NLQ) from a user;

initialize a result data structure to store potential translations of the NLQ in a domain-specific language (DSL); and provide the NLQ and the result data structure as inputs to a language model, wherein the language model comprises a pre-trained neural sequence-to-sequence model, wherein the language model is configured to perform encoding of the NLQ and then to sequentially determine a next potential token for each of the potential translations of the result data structure over a plurality of auto-regressive decoding steps, and wherein, after each auto-regressive decoding step of the plurality of auto-regressive decoding steps of the language model, the instructions further comprise instructions to:

provide the result data structure as input to a DSL parser, wherein the result data structure includes a respective confidence score determined by the language model for each of the potential translations during each auto-regressive decoding step, discarding, via the DSL parser, a first one or more potential translations of the result data structure based on the respective confidence score of each of the first one or more potential translations, perform, via the DSL parser, an evaluation of the potential translations of the result data structure based on DSL rules of the DSL parser, and discard, via the DSL parser, a second one or more of the potential translations of the result data structure based on the evaluation.

17. The medium of claim 16, wherein the language model is configured to determine the respective confidence score for each of the potential translations of the result data structure at each of the plurality of auto-regressive decoding steps, wherein the DSL parser is configured to only evaluate a number of potential translations of the result data structure having highest respective confidence scores, and wherein the number defines a cut-off value of the DSL parser.

* * * * *